Dec. 18, 1962
J. C. WILSON
3,068,577
RADIUS SCRIBER
Filed Aug. 18, 1961
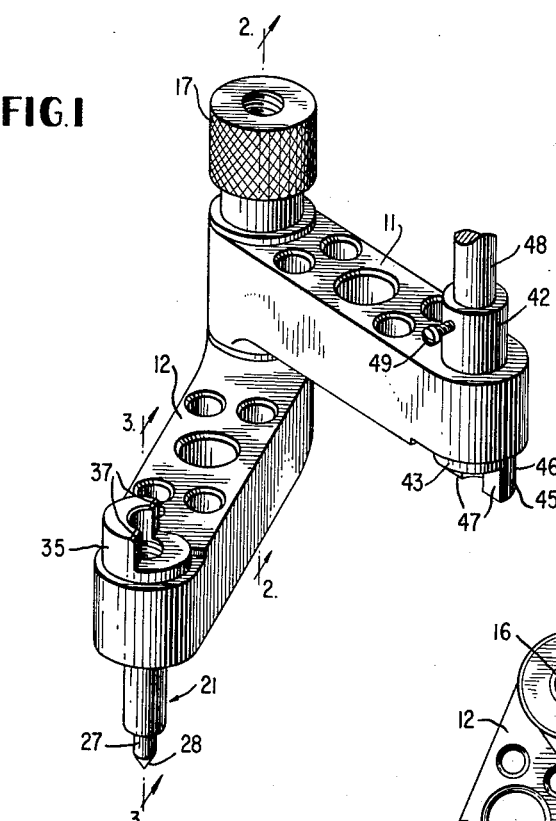
FIG.1
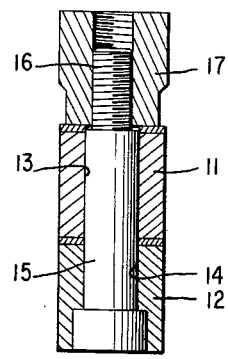
FIG.2
FIG.4
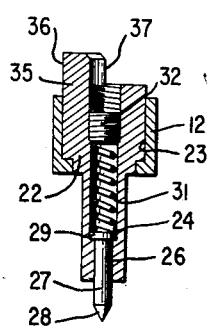
FIG.3
INVENTOR.
JAMES C. WILSON
BY
FRANKLIN D. WOLFFE
*ATTORNEY*

3,068,577
RADIUS SCRIBER
James C. Wilson, Port Dickinson, N.Y., assignor to Universal Instruments Corporation, Binghamton, N.Y., a corporation of New York
Filed Aug. 18, 1961, Ser. No. 132,408
1 Claim. (Cl. 33—27)

The present invention relates to a radius scriber for scribing arcs of circles, and more particularly to a device having a pair of pivotally connected arms with abutment surfaces on the arms at predetermined distances from the axes of an arbor-receiving aperture and a scriber element.

In the making of drawings, and in layout work generally, it is usually necessary that one or more circular arcs be drawn, and various types of instruments have been provided heretofore for this purpose. Two of the more well known types of instruments are the compass and the beam trammel. Generally, the compass has been used for relatively low accuracy work, the two legs of the compass being spread apart and the points of the compass placed against a suitable ruler to determine the distance between these points; its cost is relatively low. The beam trammel, on the other hand, is often a more accurate instrument, and some include a measuring scale of good accuracy incorporated in it; beam trammels may even have vernier scales to obtain accurate settings. As will be understood, the instruments are only as accurate as their incorporated scales, so that their cost is increased with an increase in the accuracy of the scale. Thus, while greater accuracy is obtainable with the beam trammel type instrument, it is inherently more expensive, and is difficult and time-consuming to set to the desired radius.

An object of the present invention is to provide a radius scriber which may be set with great accuracy.

Another object of the present invention is the provision of a radius scriber which may be set with great accuracy, and which is of relatively economical construction.

A further object of the present invention is to provide a radius scriber which may be set to great accuracy and which does not require costly scale markings to be included in its construction.

Yet another object of the present invention is the provision of a radius scriber which may be readily set to an extremely accurate, desired setting.

A further object of the present invention is to provide a scriber which may be set with great accuracy through the utilization of measuring instrumentalities commonly found in shops and plants.

Other objects and the nature and advantages of the instant invention will be apparent from the following description taken in conjunction with the accompanying drawings, wherein:

FIGURE 1 is a perspective view of a scriber in accordance with the present invention.

FIGURE 2 is a cross-sectional view taken on the line 2—2 of FIG. 1 and showing the clamping arrangement of the radius scriber of FIG. 1.

FIGURE 3 is a cross-sectional view taken on the line 3—3 of FIGURE 1 and showing the scriber point and the associated abutment surface.

FIGURE 4 is a plan view with parts broken away showing the radius scriber of FIG. 1 being set with the aid of micrometers.

Referring now to the drawings, wherein like or corresponding parts bear like or corresponding reference characters throughout the several views, there is shown in FIG. 1 a radius scriber 10 having an upper arm 11 and a lower arm 12. The upper arm 11 has adjacent one end thereof a hole 13, see FIG. 2, which in practice is machined to high accuracy, and may be provided with a bushing (not shown). The lower arm 12 has a corresponding hole 14 adjacent one end thereof, and a post 15 extends through the holes 13 and 14. Preferably, post 15 is press fit into the hole 14 of lower arm 12, so that it is irrotationally held in the arm 12, and has arm 11 journalled on it by means of the hole 13. The upper end of post 15 is threaded, as at 16, and is threadedly received in a clamping knob 17.

At the end of the lower arm 12 which is remote from the post 15 there is provided a scriber element generally designated 21, this scriber element extending downwardly from beneath the lower arm 12. The axis of the scriber element 21 is parallel to the axis of post 15. As may be seen in FIG. 3, the scriber element 21 comprises a cylindrical body 22 which may be press fit or otherwise secured in a hole 23 adjacent an end of the lower arm 12. The body 22 has a bore 24 therein which is connected with a bore 26 at its lower end, bore 26 being of reduced diameter relative to bore 24. A hard scriber tip 27 of carbide or the like having a point 28 and an enlarged head 29 extends through the bore 26, and is pressed downwardly by the spring 31 which is held in the bore 24 by a screw 32.

There is carried by the body 22 an upwardly extending semicircular abutment 35 having a very accurately machined outer surface 36 which is concentric with the axis of the scriber element 21. The abutment 35 has a pair of flat faces 37, these lying along the plane which passes through the axes of post 15 and scriber element 21 and their positioning being facilitated by flattened faces of body 22 and hole 23.

Referring to FIGURES 1 and 4 there may be seen in the end of upper arm 11 remote from the post 15 a flat-sided aperture 41 which receives a similarly shaped plug 42, plug 42 extending upwardly above the upper surface of the upper arm 11, and having at its lower end an enlarged head 43 which carries an abutment 45 that is of semi-circular configuration. The abutment 45 has an accurately machined surface 46 which is concentric with the coincident axes of the aperture 41 and plug 42. These coincident axes are parallel to the axis of post 15, and the distance between the axis of plug 42 and post 15 is the same as the distance between the axis of scriber element 21 and post 15. Similar to the abutment 35, abutment 45 has a pair of surfaces 47 which lie in a plane that contains the axes of post 45 and plug 42.

Plug 42 is secured in any desired fashion in the arm 11, and has in its upper end a socket for receiving an arbor 48 of a cooperating machine; a set screw 49 is provided to hold the arbor 48 in the socket of plug 42. Arbor 48 may be held, instead, by a taper shank.

The setting of the radius scriber 10 is best shown in FIG. 4, there being shown therein a micrometer M which has been set to a desired opening. In practice, the radii of the concentric surfaces 36 and 46 will total a known and convenient figure, it having been found that making each radius one-half inch is most convenient. Consequently, the opening of the micrometer M is set at exactly one inch greater than the radius desired. The clamping knob 17 of scriber 10 is then rotated so as to permit relative movement between the arms 11 and 12. The arms 11 and 12 are then spread apart an amount necessary to enable the surfaces 36 and 46 of the abutments 35 and 45 to engage the anvils of the micrometer M. Thereafter, it is only necessary to tighten the clamping knob 17 to cause the radius scriber to be fixed in the desired position. The radius scriber 10 may be set either before or after placing it on arbor 48. The entire radius scriber may then be rotated about the axis of plug 42, causing the point 28 to scribe an arc which is concentric to the axis of plug 42.

When the radius scriber 10 is not in use, it may be folded into a very compact configuration with the arm 11 overlying the arm 12, and with the abutment 35 overlapping the abutment 45, the surfaces 37 being in contact with the surfaces 47; the radius scriber 10 may be locked in this position to scribe linear lines.

There has been provided a radius scriber which is of relatively economical manufacture, since it requires no costly scale markings, and which may be set with great accuracy. The radius scriber of the present invention utilizes the accuracy of other measuring instruments, such as micrometers, which are commonly available. Further, there has been provided a radius scriber which may be folded into a compact configuration, so as to take up a minimum of space in storage.

It will be obvious to those skilled in the art that various changes may be made without departing from the spirit of the invention and therefore the invention is not limited to what is shown in the drawings and described in the specification but only as indicated in the appended claim.

I claim:

A device for scribing circular arcs of precise radii comprising: an upper arm and a lower arm, each arm having a first and second circular hole adjacent each end thereof, said holes having parallel axes with the distances between axes of the first and second holes in each arm being equal; a post with a threaded end extending through the first holes in both arms pivotally securing said arms together, said post being fixedly held in one arm and rotatably journalled in the other; a clamping nut on the threaded end of said post for clamping said arms in preselected relative positions; a scriber element fixedly mounted in the second hole in the lower arm and extending downwardly therefrom, a bore in said scriber element coaxial with the second hole in the lower arm, a scriber tip mounted coaxially in the lower end of said bore, an abutment portion of the scriber element extending upwardly of said lower arm; a plug fixedly mounted in the second hole in the upper arm and having a socket portion extending upwardly of said upper arm containing an arbor-receiving bore concentric with the second hole in the upper arm, an abutment portion extending downwardly of said upper arm; said abutment portions in the lower and upper arms each comprised in part of a semi-circular face concentric with the axial bore in its respective arm and a diametric flat face defined by a plane between the axes of the first and second holes in the respective arms, the abutment portions being in opposed relationship so that when the flat faces are in face to face relationship, the semi-circular faces are coaxial, whereby a precise setting of the distance between said scriber tip axes and said arbor receiving bore axis may be obtained by measuring the distance across said abutments even when the distance is less than a diameter of one of the circular measuring surfaces.

References Cited in the file of this patent

UNITED STATES PATENTS

| | | |
|---|---|---|
| 986,239 | Stoddard | Mar. 7, 1911 |
| 2,369,477 | Martin | Feb. 13, 1945 |
| 2,505,236 | Dooley | Apr. 25, 1950 |

FOREIGN PATENTS

| | | |
|---|---|---|
| 905 | Great Britain | 1904 |
| 381,592 | Italy | July 13, 1940 |